US012682686B2

(12) United States Patent
Li et al.

(10) Patent No.: US 12,682,686 B2
(45) Date of Patent: Jul. 14, 2026

(54) FACE LIVENESS DETECTION METHODS AND APPARATUSES

(71) Applicant: Ant Blockchain Technology (Shanghai) Co., Ltd., Shanghai (CN)

(72) Inventors: Jianshu Li, Hangzhou (CN); Yan Xu, Hangzhou (CN)

(73) Assignee: Ant Blockchain Technology (Shanghai) Co., Ltd., Shanghai (CN)

( * ) Notice: Subject to any disclaimer, the term of this patent is extended or adjusted under 35 U.S.C. 154(b) by 312 days.

(21) Appl. No.: 18/531,128

(22) Filed: Dec. 6, 2023

(65) Prior Publication Data

US 2024/0104965 A1 Mar. 28, 2024

Related U.S. Application Data

(63) Continuation of application No. PCT/CN2022/105054, filed on Jul. 12, 2022.

(30) Foreign Application Priority Data

Aug. 23, 2021 (CN) .......................... 202110966357.5

(51) Int. Cl.
*G06V 40/40* (2022.01)
*G06V 10/22* (2022.01)
(Continued)

(52) U.S. Cl.
CPC .............. *G06V 40/45* (2022.01); *G06V 10/22* (2022.01); *G06V 40/171* (2022.01); *G06V 40/67* (2022.01)

(58) Field of Classification Search
CPC ...... G06V 40/45; G06V 10/22; G06V 40/171; G06V 40/67; G06V 10/764; G06V 40/168;
(Continued)

(56) References Cited

U.S. PATENT DOCUMENTS 8,542,879 B1 * 9/2013 Nechyba ................ G06V 40/45
382/118
10,885,362 B2 1/2021 Lin et al.
(Continued)

FOREIGN PATENT DOCUMENTS

CN 105426827 3/2016
CN 107066983 8/2017
(Continued)

OTHER PUBLICATIONS

International Preliminary Report on Patentability in Appln. No. PCT/CN2022/105054, mailed on Marh 7, 2024, 11 pages (with English translation).
International Search Report and Written Opinion in Appln. No. PCT/CN2022/105054, mailed on Oct. 10, 2022 pages (with English translation).

*Primary Examiner* — John Villecco
*Assistant Examiner* — Kyla Guan-Ping Tiao Allen
(74) *Attorney, Agent, or Firm* — Fish & Richardson P.C.

(57) ABSTRACT

Some embodiments of this specification provide face liveness detection computer-implemented methods, devices, and media. In an example, multiple face images continuously captured for a first user are obtained. Two face images are selected from the multiple face images for a target attribute in one or more predetermined image attributes, where a degree of difference between two attribute values of the target attribute corresponding to the two face images satisfies a predetermined criterion. Both of the two face images are input into a pre-trained face liveness detection model corresponding to the target attribute to obtain a detection result corresponding to the target attribute.

20 Claims, 3 Drawing Sheets

(51) Int. Cl.
   *G06V 40/16*        (2022.01)
   *G06V 40/60*        (2022.01)
(58) Field of Classification Search
   CPC ...... G06V 10/82; G06V 40/172; G06V 40/40;
                      G06N 3/08; G06N 3/045
   See application file for complete search history.

(56)             References Cited

U.S. PATENT DOCUMENTS

| | | | |
|---|---|---|---|
| 2018/0357500 A1* | 12/2018 | Lin ........................ | G06V 40/40 |
| 2019/0138787 A1* | 5/2019 | Zhang ..................... | G06N 3/08 |
| 2020/0320282 A1* | 10/2020 | Boic ...................... | G06V 40/45 |
| 2021/0256281 A1 | 8/2021 | Henson et al. | |

FOREIGN PATENT DOCUMENTS

| | | | | |
|---|---|---|---|---|
| CN | 107451547 | 12/2017 | | |
| CN | 109086645 | 12/2018 | | |
| CN | 111144365 | 5/2020 | | |
| CN | 111723655 A | 9/2020 | | |
| CN | 112001240 A * | 11/2020 | ............. | G06N 3/045 |
| CN | 112966562 | 6/2021 | | |
| CN | 113505756 | 10/2021 | | |
| CN | 116110111 | 5/2023 | | |
| EP | 2806373 | 11/2014 | | |
| WO | 2019029459 A1 | 2/2019 | | |
| WO | WO 2023/024734 | 3/2023 | | |

* cited by examiner

FACE LIVENESS DETECTION METHODS AND APPARATUSES

CROSS-REFERENCE TO RELATED APPLICATIONS

This application is a continuation of PCT Application No. PCT/CN2022/105054, filed on Jul. 12, 2022, which claims priority to Chinese Patent Application No. 202110966357.5, filed on Aug. 23, 2021, and each application is hereby incorporated by reference in its entirety.

TECHNICAL FIELD

One or more embodiments of this specification relate to the field of machine learning technologies, and in particular, to face liveness detection methods and apparatuses.

BACKGROUND

Liveness detection is a technology for determining genuine physiological features of objects in some identity verification scenarios. Face liveness detection is commonly used in facial recognition applications to verify whether a user is operating as the genuine living person. Such practice can defend against attacks such as photos, face swapping, masks, and obstructions, thereby preventing user identity theft, detecting fraudulent behaviors, and safeguarding user interests.

However, with widespread applications of the face liveness detection technology, higher requirements are imposed on this application, for example, enhancement of security and user experience. Therefore, a face liveness detection solution is needed to ensure security of detection algorithms while improving user experience in using related services.

SUMMARY

One or more embodiments of this specification describe face liveness detection methods and apparatuses. In a detection process, interactive actions between a photographing terminal and a user can be hidden, thereby effectively defending against attacks on detection algorithms and effectively improving user experience.

According to a first aspect, a face liveness detection method is provided, including: multiple face images continuously captured for a first user are obtained; two face images are selected from the multiple face images for any target attribute in one or more predetermined image attributes, where a degree of difference between two attribute values of the target attribute corresponding to the two face images satisfies a predetermined criterion; and both of the two face images are input into a pre-trained face liveness detection model corresponding to the target attribute to obtain a detection result corresponding to the target attribute.

In an embodiment, that multiple face images continuously captured for a first user are obtained includes the following: based on a user terminal of the first user, the first user is prompted to adjust a photographing method to improve face image quality; and during the prompting, the multiple face images are continuously photographed by using the user terminal.

In a specific embodiment, that the first user is prompted to adjust a photographing method includes the following: prompting to adjust a position of a face relative to the user terminal; and/or prompting to adjust a light intensity of a photographing environment.

In an embodiment, that two face images are selected from the multiple face images for any target attribute in one or more predetermined image attributes includes the following: multiple attribute values of the target attribute corresponding to the multiple face images are determined; and two face images whose degree of difference between corresponding attribute values satisfies the predetermined criterion are selected from the multiple face images based on the multiple attribute values.

In a specific embodiment, when the target attribute is a face size, that multiple attribute values of the target attribute corresponding to the multiple face images are determined includes the following: the multiple face images are separately input into a trained face detection model to obtain multiple face regions corresponding to the multiple face images; and multiple face region areas corresponding to the multiple face regions are determined.

In another specific embodiment, when the target attribute is a facial organ size, that multiple attribute values of the target attribute corresponding to the multiple face images are determined includes the following: the multiple face images are separately input into a trained facial organ detection model to obtain multiple facial organ regions corresponding to the multiple face images; and multiple organ region areas corresponding to the multiple facial organ regions are determined.

In still another specific embodiment, when the target attribute is a light intensity, that multiple attribute values of the target attribute corresponding to the multiple face images are determined includes the following: the multiple face images are separately into a trained light intensity evaluation model to obtain multiple light intensities.

In another aspect, in a specific embodiment, that two face images whose degree of difference between corresponding attribute values satisfies the predetermined criterion are selected from the multiple face images based on the multiple attribute values includes the following: a maximum value and a minimum value in the multiple attribute values are determined to obtain the two corresponding face images.

In a specific embodiment, that two face images whose degree of difference between corresponding attribute values satisfies the predetermined criterion are selected from the multiple face images based on the multiple attribute values includes the following: two face images whose degree of difference between the corresponding attribute values is greater than a predetermined threshold are selected from the multiple face images.

In an embodiment, the one or more image attributes are multiple image attributes; and after the obtaining a detection result corresponding to the target attribute, the method further includes the following: a final detection result for the first user is determined based on multiple detection results corresponding respectively to the multiple image attributes.

In a specific embodiment, that a final detection result for the first user is determined based on multiple detection results corresponding respectively to the multiple image attributes includes the following: when the multiple detection results all indicate that the first user succeeds in face liveness detection, the final detection result is determined as a face liveness detection success.

According to a second aspect, a face liveness detection apparatus is provided, including: an image acquisition unit, configured to obtain multiple face images continuously captured for a first user; an image selection unit, configured to select two face images from the multiple face images for any target attribute in one or more predetermined image attributes, where a degree of difference between two attribute values of the target attribute corresponding to the two face images satisfies a predetermined criterion; and a liveness detection unit, configured to input both of the two face images into a pre-trained face liveness detection model corresponding to the target attribute to obtain a detection result corresponding to the target attribute.

According to a third aspect, a computer-readable storage medium is provided, where the computer-readable storage medium stores a computer program, and when the computer program is executed in a computer, the computer is enabled to perform the method according to the first aspect.

According to a fourth aspect, a computing device is provided, including a memory and a processor. The memory stores executable code, and when executing the executable code, the processor implements the method according to the first aspect.

By using the methods and the apparatuses provided in the embodiments of this specification, face image-related user interaction information actually used in algorithms can be effectively hidden to improve security of face liveness detection algorithms. In addition, accuracy and availability of detection results can be effectively improved by performing face liveness detection on face images with a relatively large attribute difference.

BRIEF DESCRIPTION OF DRAWINGS

To describe the technical solutions of the embodiments of this specification more clearly, the following briefly describes the accompanying drawings needed for describing the embodiments. Clearly, the accompanying drawings in the following description show merely some embodiments of this specification, and a person of ordinary skill in the art can still derive other drawings from these accompanying drawings without creative efforts.

DESCRIPTION OF EMBODIMENTS

The solutions provided in this specification are described below with reference to the accompanying drawings.

Currently, face liveness detection technologies are widely used. In a detection solution, a user is required to perform a combination of actions such as blinking, mouth opening, head shaking, nodding, etc. to verify whether the user operates as the genuine living person by using technologies such as facial landmark localization and face tracking. However, this solution exposes the user's interactive actions in a detection algorithm, and is prone to exploit and attacks by attackers. In another detection solution, interaction with a user is not needed. However, in this solution, it is difficult to collect face images with relatively large changes, and consequently reliability of detection results is low.

Figure 1:
FIG. 1 is a schematic diagram illustrating an implementation architecture of face liveness detection, according to some embodiments.

Based on the above-mentioned observation and analysis, the inventor proposes a new face liveness detection method, which can effectively hide facial action images actually used in algorithms, thereby improving security of the detection algorithms, and effectively improving accuracy and availability of detection results. FIG. 1 is a schematic diagram of an implementation architecture of face liveness detection, according to some embodiments. As shown in FIG. 1, multiple face images continuously captured for a first user are obtained, and N (which is a positive integer) face image pairs corresponding to N image attributes are constructed based on the multiple face images, where each image pair has a large difference for an image attribute corresponding to the image pair; afterwards, the ith random face image pair is input into the ith face liveness detection model corresponding to the ith image attribute to obtain the ith detection result; and then, a final detection result of performing face liveness detection on the first user can be determined based on N obtained detection results. As such, an accurate face detection result can be obtained securely and efficiently.

Figure 2:
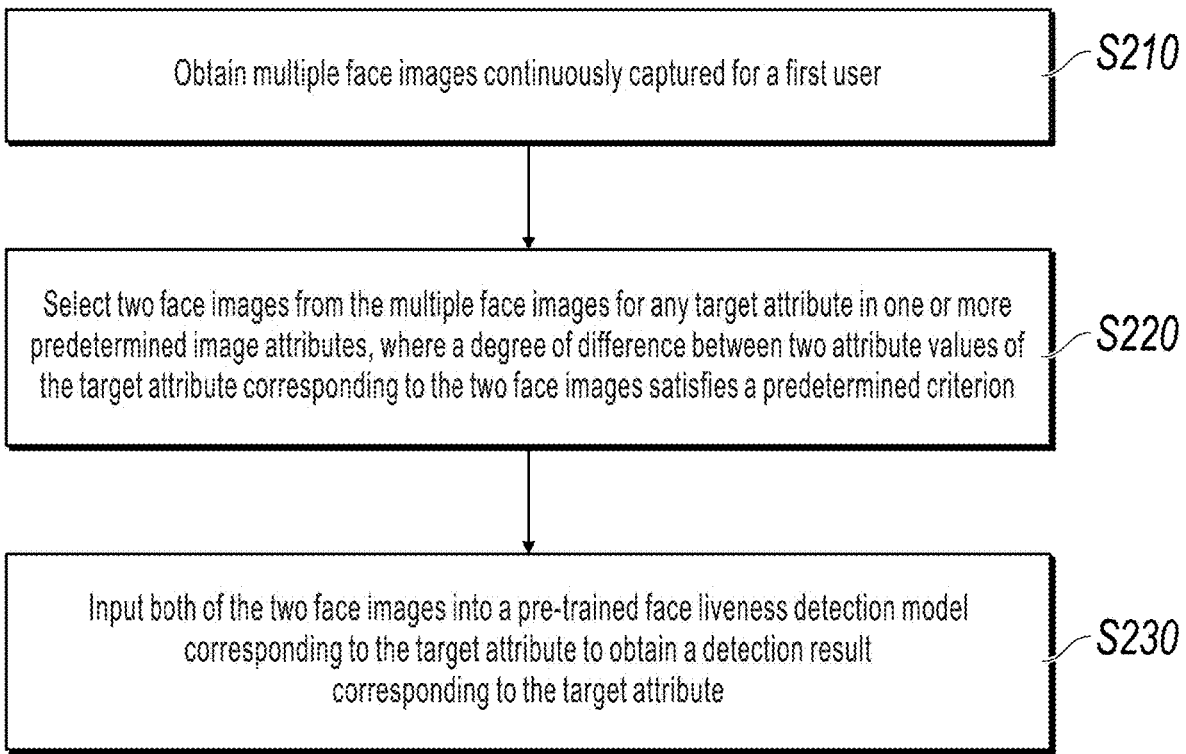
FIG. 2 is a schematic flowchart illustrating a face liveness detection method, according to some embodiments.

Specific implementation steps of the above-mentioned method are described below with reference to some specific embodiments. FIG. 2 is a schematic flowchart of a face liveness detection method, according to some embodiments. The method can be executed by any server, apparatus, device cluster, or the like that has computing and processing capabilities. As shown in FIG. 2, the method includes the following steps.

Step S210: Obtain multiple face images continuously captured for a first user. Step S220: Select two face images from the multiple face images for any target attribute in one or more predetermined image attributes, where a degree of difference between two attribute values of the target attribute corresponding to the two face images satisfies a predetermined criterion. Step S230: Input both of the two face images into a pre-trained face liveness detection model corresponding to the target attribute to obtain a detection result corresponding to the target attribute.

The above-mentioned steps are elaborated as follows:

First, in step S210, multiple face images continuously captured for the first user are obtained.

In an implementation, when the face images are recorded, the user can be enabled to perceive adjustments on image quality, thereby capturing face images that have a high degree of difference. Such practice can avoid user experience deterioration and decrease of detection algorithm security that are caused by requiring the user to perform a specific combination of actions such as blinking and mouth opening. In addition, enough face images that have large changes (covering a photographing angle of the user, light of a photographing environment, and the like) can be obtained.

In an embodiment, this step can include the following: prompting, based on a user terminal of the first user from a perspective of improving face image quality, the first user to adjust a photographing method; and during the prompting, continuously photographing the multiple face images by using the user terminal. In a specific embodiment, the prompting the first user to adjust a photographing method can include the following: prompting the first user to adjust a position of the first user's face relative to the first user's user terminal. In an example, the first user is prompted to keep the first user's face at the center of a screen image. In an example, the user is prompted to move away from or approach the user terminal to control a size of a photographed face or to photograph an entire face of the user. In another specific embodiment, the prompting the first user to adjust a photographing method can include the following: prompting the first user to adjust a light intensity of a photographing environment. For example, when light is intense in a current environment, the first user is prompted to move to an area with low light to perform photographing. For another example, when light is low in a current environment, the first user is prompted to increase ambient brightness. As such, the user makes some adjustments according to prompts. Therefore, photos with a significant difference usually exist in multiple face images continuously captured for an adjustment process.

In another aspect, in a specific embodiment, the continuously photographing the multiple face images by using the user terminal can include the following: continuously photographing the multiple face images at a predetermined time interval. In another specific embodiment, the continuously photographing the multiple face images by using the user terminal can include the following: performing photographing for consecutive times until a predetermined quantity of face images are obtained and used as the multiple face images.

In another implementation, it is feasible that no photographing prompt is provided for the user. Instead, the user terminal quickly and continuously photographs the multiple face images in response to start triggering of a photographing function.

From the description above, multiple face images photographed for the first user can be obtained. Then, in step S220, the two face images are selected from the multiple face images for the any target attribute in the one or more predetermined image attributes, where the degree of difference between the two attribute values of the target attribute corresponding to the two face images satisfies the predetermined criterion.

It should be understood that, "several" in this specification refers to "one or more". In addition, the one or more image attributes can be predetermined by an operator based on actual experience. For example, the one or more image attributes can include a size or an area of a face region, a size or an area of a facial organ (for example, a nose, eyes, a forehead, or the like), a light intensity, and the like of an image. Each of the one or more image attributes can be individually used as a target attribute.

In an implementation, this step can include the following: first determining multiple attribute values of the target attribute corresponding to the multiple face images; and then, selecting, from the multiple face images based on the multiple attribute values, two face images whose degree of difference between corresponding attribute values satisfies the predetermined criterion.

In an embodiment, when the target attribute is a face size in an image, the determining corresponding multiple attribute values can include the following: separately inputting the multiple face images into a trained face detection model to obtain multiple face regions corresponding to the multiple face images; and determining multiple face region areas corresponding to the multiple face regions as multiple attribute values corresponding to the face size attribute. In a specific embodiment, the face detection model can be implemented based on a convolutional neural network (CNN) or a deep neural network (DNN). In a specific embodiment, the face detection model can be implemented based on a target detection algorithm. Specifically, a target detection model is trained by using faces as target objects, and is used as the face detection model. As such, a regression box for selecting a face position in any face image can be obtained by inputting the face image into the trained face detection model, and further a region enclosed by the regression box can be used as a corresponding face region.

In another embodiment, when the target attribute is a facial organ size in an image, the determining corresponding multiple attribute values can include the following: separately inputting the multiple face images into a trained facial organ detection model to obtain multiple facial organ regions corresponding to the multiple face images; and determining multiple organ region areas corresponding to the multiple facial organ regions as multiple attribute values corresponding to the facial organ size attribute. In a specific embodiment, facial organs can include eyes, a nose, a forehead, a mouth, ears, and the like. The above-mentioned facial organ size can be a size of a certain facial organ, or can be a total size of one or more facial organs. In a specific embodiment, the facial organ detection model can be implemented based on a CNN network or a DNN network.

In a specific embodiment, the facial organ detection model can be implemented based on a target detection algorithm. Specifically, a target detection model is trained by using facial organs as target objects, and is used as the facial organ detection model. As such, a regression box for selecting a facial organ position in any face image can be obtained by inputting the face image into the trained facial organ detection model, and further a region enclosed by the regression box can be used as a corresponding facial organ region. In an example, the above-mentioned facial organ size corresponds to a total size of multiple facial organs. Correspondingly, the facial organ detection model can include multiple sub-models, which are configured to correspondingly label multiple sub-regions of multiple facial organs in any face image, so as to determine a sum of areas of the multiple sub-regions as a facial organ size corresponding to the any face image.

In still another embodiment, when the target attribute is an ambient light intensity in an image, the determining corresponding multiple attribute values can include the following: separately inputting the multiple face images into a trained light intensity evaluation model to obtain multiple light intensities. In a specific embodiment, the light intensity evaluation model can be implemented based on a CNN network or a DNN network.

In the description above, determining of multiple attribute values of the target attribute corresponding to the multiple face images is described by using examples in which the target attribute is the face size, the facial organ size, and the ambient light intensity in an image. Actually, the target attribute can alternatively be another image attribute, such as an image color temperature or image saturation.

Further, two face images whose degree of difference between attribute values corresponding to the target attribute satisfies the predetermined criterion are selected from the multiple face images based on the multiple determined attribute values. In an embodiment, a maximum value and a minimum value in the multiple attribute values can be determined, and further a face image corresponding to the maximum value and a face image corresponding to the minimum value are used as the two face images corresponding to the target attribute. In another embodiment, two face images whose degree of difference between corresponding attribute values is greater than a predetermined threshold (denoted as k) can be selected from the multiple face images. In a specific embodiment, one attribute value (denoted as $x_a$) can be randomly selected from the multiple attribute values, and then one attribute value $x_b$ greater than $x_a+k$ can be selected from the other attribute values. As such, a face image corresponding to the attribute value $x_a$ and a face image corresponding to the attribute value $x_b$ can be used as the two face images corresponding to the target attribute. In another specific embodiment, a difference between any two of the multiple attribute values can be first calculated to obtain multiple differences. Then, one difference can be randomly selected from one or more differences that are in the multiple differences and that are greater than the predetermined threshold, and further, two face images corresponding to the difference can be used as the two face images corresponding to the target attribute.

In the description above, the two face images corresponding to the target attribute can be determined based on the multiple attribute values of the target attribute corresponding to the multiple face images.

In another implementation, an attribute value (denoted as $x_1$) of the target attribute corresponding to a certain face image is first determined based on the multiple face images, and attribute values of the other face images are then determined one by one, until a difference between the attribute value $x_1$ and an attribute value $x_j$ determined at the jth time is greater than the predetermined threshold. In this case, determining of an attribute value of the target attribute corresponding to a remaining face image is stopped, and the face image corresponding to the attribute value $x_1$ and a face image corresponding to the attribute value $x_j$ are used as the two face images corresponding to the target attribute.

In the description above, two face images corresponding to the target attribute can be selected based on the multiple obtained face images to form a face image pair with a significant difference in case of the target attribute. Then, in step S230, both of the two face images are input into the pre-trained face liveness detection model corresponding to the target attribute to obtain the detection result corresponding to the target attribute.

In an embodiment, the face liveness detection model can be implemented based on a DNN network, a CNN network, a fast CNN, or a faster CNN. In an embodiment, the face liveness detection model can be implemented as a learning to compare model. In an embodiment, the face liveness detection model and the above-mentioned machine learning model used to determine attribute values of the target attribute (or referred to as an attribute value prediction model for short) can be separately trained. For example, the attribute value prediction model corresponding to the target attribute is first trained, and then the face liveness detection model corresponding to the target attribute is trained based on the trained attribute value prediction model and multiple obtained training image samples. In another embodiment, the face liveness detection model and the attribute value prediction model that correspond to the target attribute can be jointly trained.

It should be understood that, an obtained detection result corresponding to the target attribute indicates a face liveness detection result obtained based on the differential pictures in case of the target attribute. For example, if the detection succeeds, it can be determined that the photographed face images come from a genuine living user; or if the detection fails, it can be determined that the photographed face images do not come from a genuine living user, and actually may be rephotographed copies of a color-printed face image, etc.

In the description above, the detection result corresponding to the target attribute can be obtained. Further, in an implementation, if the one or more image attributes are one image attribute, a detection result corresponding to this image attribute can be directly used as a final detection result. In another implementation, if the one or more image attributes are multiple image attributes, correspondingly, the multiple image attributes can be separately used as target attributes to obtain multiple detection results corresponding respectively to the multiple image attributes. Further, after step S230, a final detection result for the first user can be determined based on the multiple detection results. In an embodiment, when a proportion of results indicating a detection success in the multiple detection results reaches a predetermined proportion (for example, 70% or 100%), the final detection result is determined as that the first user succeeds in the face liveness detection, or otherwise determined as that the first user fails the face liveness detection. In another embodiment, the detection results each include a probability indicating a detection success. Based on this, in a specific embodiment, these probabilities can be averaged. When an average value is greater than a predetermined threshold (for example, 80% or 90%), the final detection result is determined as that the first user succeeds in the face liveness detection, or otherwise determined as that the first user fails the face liveness detection. In another specific embodiment, different weights can be assigned to the multiple image attributes, and then weighted summation can be performed on the multiple probabilities included in the multiple detection results. When a weighted probability is greater than a predetermined threshold (for example, 60% or 70%), the final detection result is determined as that the first user succeeds in the face liveness detection, or otherwise determined as that the first user fails the face liveness detection.

In the description above, the final face liveness detection result of the first user can be determined. According to some embodiments of another aspect, the above-mentioned method can be performed by a system that provides a face liveness detection service. In one execution case, the method can be performed by a server of the system; and in another execution case, the method can be jointly performed by a client and a server in the system. Specifically, the first user triggers a face liveness detection function by using the client of the system, and then the client processes multiple human images photographed by the user terminal, selects a face image pair corresponding to each of the one or more image attributes, and uploads one or more face image pairs corresponding to the one or more image attributes to the server. Afterwards, the server correspondingly processes the one or more face image pairs by using one or more face liveness detection models corresponding to the one or more image attributes to obtain one or more detection results, and further determines a final face liveness detection result for the first user based on the one or more detection results.

In conclusion, by using the face liveness detection method disclosed in the embodiments of this specification, a user does not have to perform a specific combination of actions, and face images actually used in algorithms can be effectively hidden to improve security of the detection algorithms. In addition, accuracy and availability of detection results can be effectively improved by performing face liveness detection on images with a relatively large attribute difference.

Figure 3:
FIG. 3 is a schematic structural diagram illustrating a face liveness detection apparatus, according to some embodiments.
Figure 3:
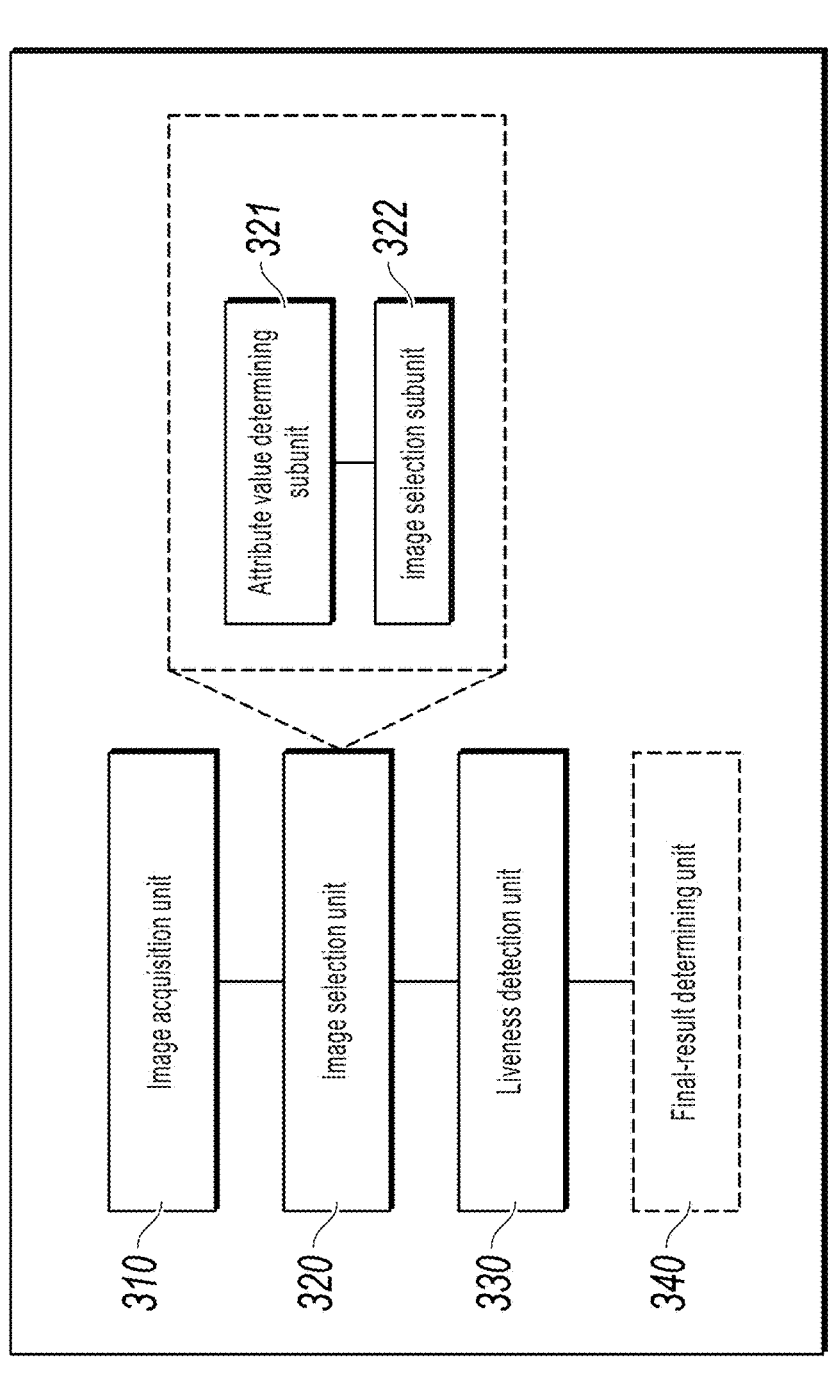

Corresponding to the above-mentioned detection method, some embodiments of this specification further disclose a detection apparatus. FIG. 3 is a schematic structural diagram of a face liveness detection apparatus, according to some embodiments. The apparatus can be implemented as any server, device cluster, or the like that has computing and processing capabilities. As shown in FIG. 3, the apparatus 300 includes the following units: an image acquisition unit 310, configured to obtain multiple face images continuously captured for a first user; an image selection unit 320, configured to select two face images from the multiple face images for any target attribute in one or more predetermined image attributes, where a degree of difference between two attribute values of the target attribute corresponding to the two face images satisfies a predetermined criterion; and a liveness detection unit 330, configured to input both of the two face images into a pre-trained face liveness detection model corresponding to the target attribute to obtain a detection result corresponding to the target attribute.

In an embodiment, the image acquisition unit 310 is specifically configured to prompt, based on a user terminal of the first user, the first user to adjust a photographing method to improve face image quality; and during the prompting, continuously photograph the multiple face images by using the user terminal.

In a specific embodiment, that the first user is prompted to adjust a photographing method includes the following: prompting to adjust a position of a face relative to the user terminal; and/or prompting to adjust a light intensity of a photographing environment.

In an embodiment, the image selection unit 320 includes the following: an attribute value determining subunit 321, configured to determine multiple attribute values of the target attribute corresponding to the multiple face images; and an image selection subunit 322, configured to select, from the multiple face images based on the multiple attribute values, two face images whose degree of difference between corresponding attribute values satisfies the predetermined criterion.

In a specific embodiment, when the target attribute is a face size, the attribute value determining subunit 321 is specifically configured to separately input the multiple face images into a trained face detection model to obtain multiple face regions corresponding to the multiple face images; and determine multiple face region areas corresponding to the multiple face regions.

In another specific embodiment, when the target attribute is a facial organ size, the attribute value determining subunit 321 is specifically configured to separately input the multiple face images into a trained facial organ detection model to obtain multiple facial organ regions corresponding to the multiple face images; and determine multiple organ region areas corresponding to the multiple facial organ regions.

In still another specific embodiment, when the target attribute is a light intensity, the attribute value determining subunit 321 is specifically configured to separately input the multiple face images into a trained light intensity evaluation model to obtain multiple light intensities.

In another aspect, in a specific embodiment, the image selection subunit 322 is specifically configured to determine a maximum value and a minimum value in the multiple attribute values to obtain the two corresponding face images.

In a specific embodiment, the image selection subunit 322 is specifically configured to select, from the multiple face images, two face images whose degree of difference between the corresponding attribute values is greater than a predetermined threshold.

In a specific embodiment, the one or more image attributes are multiple image attributes; and the apparatus 300 further includes the following: a final-result determining unit 340, configured to determine a final detection result for the first user based on multiple detection results corresponding respectively to the multiple image attributes.

In a more specific embodiment, the final-result determining unit 340 is specifically configured to, when the multiple detection results all indicate that the first user succeeds in face liveness detection, determine the final detection result as a face liveness detection success.

In conclusion, by using the face liveness detection apparatuses disclosed in the embodiments of this specification, a user does not have to perform a specific combination of actions, and face image-related user interaction information actually used in algorithms can be effectively hidden to improve security of the detection algorithms. In addition, accuracy and availability of detection results can be effectively improved by performing face liveness detection on images with a relatively large attribute difference.

According to some embodiments of another aspect, a computer-readable storage medium is further provided. The computer-readable storage medium stores a computer program, and when the computer program is executed in a computer, the computer is enabled to perform the method described with reference to FIG. 2.

According to some embodiments of still another aspect, a computing device is further provided, including a memory and a processor. The memory stores executable code, and when executing the executable code, the processor implements the method described with reference to FIG. 2.

A person skilled in the art should be aware that in the above-mentioned one or more examples, functions described in this specification can be implemented by hardware, software, firmware, or any combination thereof. When these functions are implemented by software, they can be stored in a computer-readable medium or transmitted as one or more instructions or code on the computer-readable medium.

Some specific implementations described above further describe the purposes, technical solutions, and beneficial effects of this specification. It should be understood that the above-mentioned descriptions are merely some specific implementations of this specification and are not intended to limit the protection scope of this specification. Any modification, equivalent replacement, or improvement made based on the technical solutions of this specification shall fall within the protection scope of this specification.

What is claimed is:

1. A computer-implemented method for face liveness detection, comprising:

obtaining multiple face images continuously captured for a first user;

for each target attribute in multiple image attributes:

selecting a pair of two face images that corresponds to the target attribute from the multiple face images for the target attribute, wherein a degree of difference between two attribute values of the target attribute corresponding to the two face images satisfies a predetermined criterion; and inputting the pair of the two face images into a pre-trained face liveness detection model corresponding to the target attribute to obtain a detection result corresponding to the target attribute; and generating a final detection result for the first user by computing a weighted combination of multiple detection results obtained based on processing different pairs of face images that correspond respectively to the multiple image attributes.

2. The computer-implemented method according to claim 1, wherein the obtaining multiple face images continuously captured for a first user comprises:

prompting, via a user terminal of the first user, the first user to adjust a photographing method to improve face image quality; and during the prompting, continuously photographing the multiple face images by using the user terminal.

3. The computer-implemented method according to claim 2, wherein the prompting to adjust a photographing method comprises one or more of:

prompting to adjust a position of a face relative to the user terminal; or prompting to adjust a light intensity of a photographing environment.

4. The computer-implemented method according to claim 1, wherein selecting the pair of two face images that corresponds to the target attribute comprises:

determining multiple attribute values of the target attribute corresponding to the multiple face images; and selecting, from the multiple face images based on the multiple attribute values, two face images whose degree of difference between corresponding attribute values satisfies the predetermined criterion.

5. The computer-implemented method according to claim 4, wherein the target attribute is a face size, and the determining multiple attribute values of the target attribute corresponding to the multiple face images comprises:

separately inputting the multiple face images into a trained face detection model to obtain multiple face regions corresponding to the multiple face images; and determining multiple face region areas corresponding to the multiple face regions.

6. The computer-implemented method according to claim 4, wherein the target attribute is a facial organ size, and the determining multiple attribute values of the target attribute corresponding to the multiple face images comprises:

separately inputting the multiple face images into a trained facial organ detection model to obtain multiple facial organ regions corresponding to the multiple face images; and determining multiple organ region areas corresponding to the multiple facial organ regions.

7. The computer-implemented method according to claim 4, wherein the target attribute is a light intensity, and the determining multiple attribute values of the target attribute corresponding to the multiple face images comprises:

separately inputting the multiple face images into a trained light intensity evaluation model to obtain multiple light intensities.

8. The computer-implemented method according to claim 4, wherein the selecting, from the multiple face images based on the multiple attribute values, two face images whose degree of difference between corresponding attribute values satisfies the predetermined criterion comprises:

determining a maximum value and a minimum value in the multiple attribute values to obtain two corresponding face images.

9. The computer-implemented method according to claim 4, wherein the selecting, from the multiple face images based on the multiple attribute values, two face images whose degree of difference between corresponding attribute values satisfies the predetermined criterion comprises:

selecting, from the multiple face images, two face images whose degree of difference between the corresponding attribute values is greater than a predetermined threshold.

10. The computer-implemented method according to claim 1, wherein the generating a final detection result for the first user by computing a weighted combination of multiple detection results corresponding respectively to the multiple image attributes comprises:

in response to that the multiple detection results all indicate that the first user succeeds in face liveness detection, determining the final detection result as a face liveness detection success.

11. A computer-implemented device, comprising:

one or more processors; and one or more computer memory devices interoperably coupled with the one or more processors and having tangible, non-transitory, machine-readable media storing one or more instructions that, when executed by the one or more processors, perform one or more operations comprising:

obtaining multiple face images continuously captured for a first user;

for each target attribute in multiple image attributes:

selecting a pair of two face images that corresponds to the target attribute from the multiple face images for the target attribute, wherein a degree of difference between two attribute values of the target attribute corresponding to the two face images satisfies a predetermined criterion; and inputting the pair of the two face images into a pre-trained face liveness detection model corresponding to the target attribute to obtain a detection result corresponding to the target attribute; and generating a final detection result for the first user by computing a weighted combination of multiple detection results obtained based on processing different pairs of face images that correspond respectively to the multiple image attributes.

12. The computer-implemented device according to claim 11, wherein the obtaining multiple face images continuously captured for a first user comprises:

prompting, via a user terminal of the first user, the first user to adjust a photographing method to improve face image quality; and during the prompting, continuously photographing the multiple face images by using the user terminal.

13. The computer-implemented device according to claim 12, wherein the prompting to adjust a photographing method comprises one or more of:

prompting to adjust a position of a face relative to the user terminal; or prompting to adjust a light intensity of a photographing environment.

14. The computer-implemented device according to claim 11, wherein selecting the pair of two face images that corresponds to the target attribute comprises:

determining multiple attribute values of the target attribute corresponding to the multiple face images; and selecting, from the multiple face images based on the multiple attribute values, two face images whose degree of difference between corresponding attribute values satisfies the predetermined criterion.

15. The computer-implemented device according to claim 14, wherein the target attribute is a face size, and the determining multiple attribute values of the target attribute corresponding to the multiple face images comprises:

separately inputting the multiple face images into a trained face detection model to obtain multiple face regions corresponding to the multiple face images; and determining multiple face region areas corresponding to the multiple face regions.

16. The computer-implemented device according to claim 14, wherein the target attribute is a facial organ size, and the determining multiple attribute values of the target attribute corresponding to the multiple face images comprises:

separately inputting the multiple face images into a trained facial organ detection model to obtain multiple facial organ regions corresponding to the multiple face images; and determining multiple organ region areas corresponding to the multiple facial organ regions.

17. The computer-implemented device according to claim 14, wherein the target attribute is a light intensity, and the determining multiple attribute values of the target attribute corresponding to the multiple face images comprises:

> separately inputting the multiple face images into a trained light intensity evaluation model to obtain multiple light intensities.

18. A non-transitory, computer-readable medium storing one or more instructions executable by a computer system to perform operations comprising:

> obtaining multiple face images continuously captured for a first user;
>
> for each target attribute in multiple image attributes:
>
>> selecting a pair of two face images that corresponds to the target attribute from the multiple face images for the target attribute, wherein a degree of difference between two attribute values of the target attribute corresponding to the two face images satisfies a predetermined criterion; and
>>
>> inputting the pair of the two face images into a pre-trained face liveness detection model corresponding >> to the target attribute to obtain a detection result corresponding to the target attribute; and
>
> generating a final detection result for the first user by computing a weighted combination of multiple detection results obtained based on processing different pairs of face images that correspond respectively to the multiple image attributes.

19. The computer-implemented method according to claim 1, wherein computing the weighted combination of the multiple detection results comprises:

> computing the weighted combination based on different weights that are assigned to the multiple image attributes.

20. The computer-implemented device according to claim 11, wherein computing the weighted combination of the multiple detection results comprises:

> computing the weighted combination based on different weights that are assigned to the multiple image attributes.

\* \* \* \* \*